United States Patent
Connell et al.

(10) Patent No.: US 8,672,046 B2
(45) Date of Patent: Mar. 18, 2014

(54) DISK GANG BOLT TENSIONING STRUCTURE

(75) Inventors: Richard J. Connell, Slater, IA (US); Anthony S. Royer, Minburn, IA (US); Mark D. Beeck, Ankeny, IA (US)

(73) Assignee: Deere & Company, Moline, IL (US)

( * ) Notice: Subject to any disclaimer, the term of this patent is extended or adjusted under 35 U.S.C. 154(b) by 291 days.

(21) Appl. No.: 13/228,854

(22) Filed: Sep. 9, 2011

(65) Prior Publication Data

US 2013/0062085 A1    Mar. 14, 2013

(51) Int. Cl.
*A01B 21/02*    (2006.01)
*F16B 35/00*    (2006.01)

(52) U.S. Cl.
USPC ........... 172/556; 172/518; 172/599; 411/381; 411/382

(58) Field of Classification Search
USPC ........... 172/55, 120, 518, 548, 556, 599–604, 172/751; 411/84, 85, 87, 412, 395, 133, 411/381, 382, 411, 424
See application file for complete search history.

(56) References Cited

U.S. PATENT DOCUMENTS

| | | | | |
|---|---|---|---|---|
| 869,226 A | * | 10/1907 | Black | 172/518 |
| 1,876,749 A | * | 9/1932 | Rea | 172/518 |
| 1,996,676 A | * | 4/1935 | Hargrave | 172/558 |
| 2,575,223 A | * | 11/1951 | Madill | 172/96 |
| 3,370,653 A | | 2/1968 | Hixon | |
| 3,669,193 A | | 6/1972 | Cooper et al. | |

OTHER PUBLICATIONS

Flywheel puller, Moped Wiki. [retrieved on Aug. 29, 2011]. Retrieved from the internet: <URL:http://www.mopedarmy.com/wiki/Flywheel_puller>.

\* cited by examiner

*Primary Examiner* — Alicia Torres
(74) *Attorney, Agent, or Firm* — Quarles & Brady LLP

(57) ABSTRACT

An agricultural disk gang includes an elongated disk gang bolt having a threaded end with an externally threaded surface. A plurality of cultivating disks are supported on the disk gang bolt. A nut is threadably engaged with the externally threaded surface. The nut has a first side facing the disks and a second side facing away from the disks. The nut is disposed to axially compress the disks together on the disk gang bolt when tightened. A tensioning structure is mounted on the disk gang bolt outside of the nut. The tensioning structure has a plurality of threaded through holes. A plurality of threaded fasteners are threadably engaged with the threaded through holes and are disposed to axially compress the disks when the plurality of threaded fasteners are tightened, thereby permitting the nut to be further tightened.

19 Claims, 5 Drawing Sheets

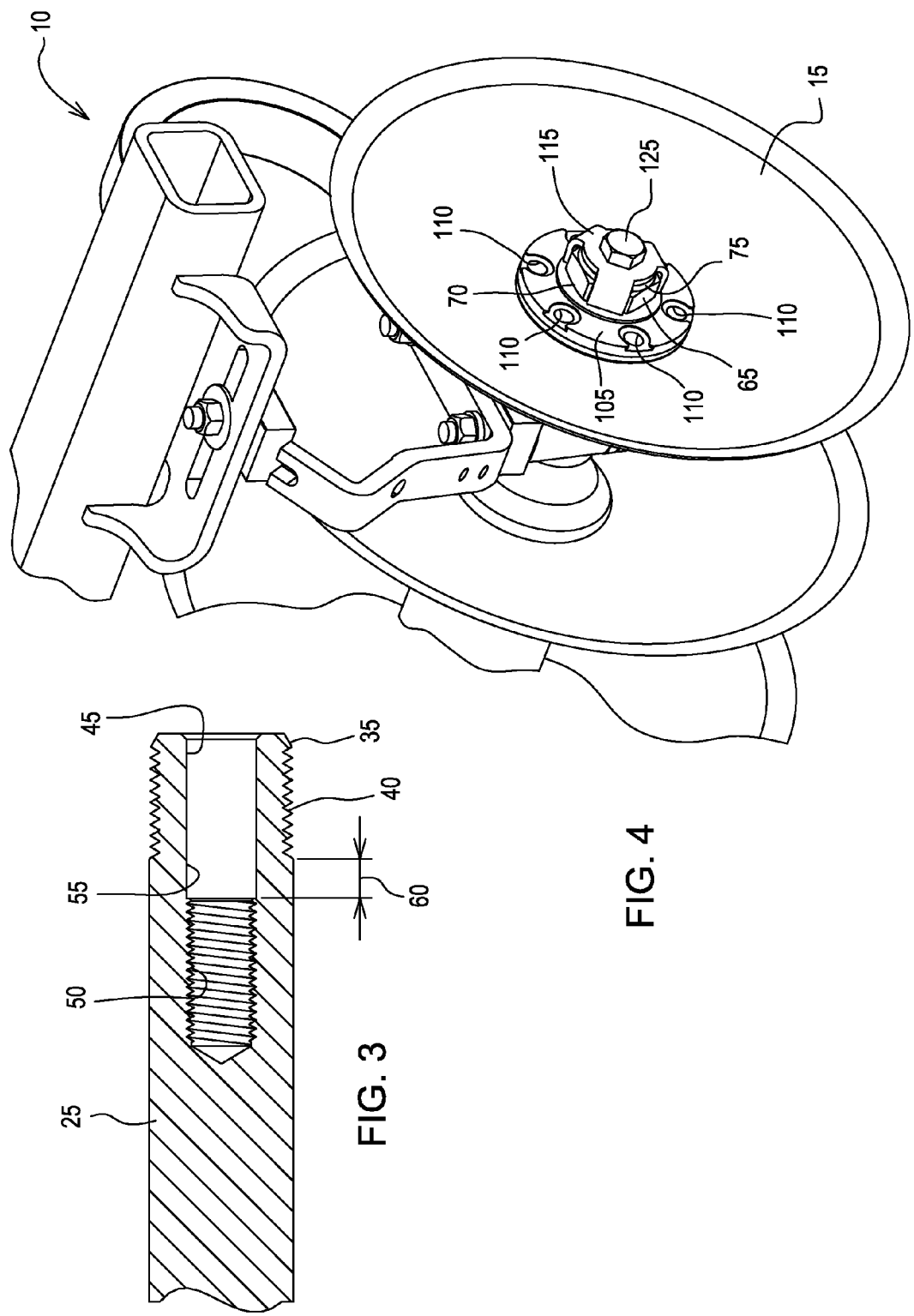

DISK GANG BOLT TENSIONING STRUCTURE

FIELD OF THE DISCLOSURE

The present disclosure generally relates to agricultural disk gangs, and more particularly to disk gang bolt tensioning structure for agricultural disk gangs.

BACKGROUND OF THE DISCLOSURE

In order to maintain the structural integrity of an agricultural disk gang under the high loads encountered in the field, agricultural disk gangs commonly include a gang bolt that passes through a plurality of disks and a gang bolt nut threaded onto the end of the gang bolt to place the gang bolt under high tension. The high tension is necessary to keep the disks and spacers in a fixed position.

Equipment manufacturers often design agricultural disk gangs with a large gang bolt diameter because operators perceive such structure to be desirable. As the gang bolt diameter becomes larger, torque on the gang bolt nut must be increased to produce adequate gang bolt tension. To provide the increased torque, gang bolt nut tightening wrenches often employ a long extension arm.

SUMMARY OF THE DISCLOSURE

In one embodiment, an agricultural disk gang includes an elongated disk gang bolt having a longitudinal axis and a threaded end with an externally threaded surface. A plurality of cultivating disks are supported on the elongated disk gang bolt. Each of the cultivating disks defines a central aperture through which the elongated disk gang bolt extends. A nut is threadably engaged with the externally threaded surface. The nut has a first side facing the cultivating disks and a second side facing away from the cultivating disks. The nut is disposed to axially compress the cultivating disks together on the disk gang bolt when tightened. A tensioning structure is mounted on the disk gang bolt outside of the nut such that the second side of the nut faces the tensioning structure. The tensioning structure defines a plurality of threaded through holes. A plurality of threaded fasteners are threadably engaged with the threaded through holes and are disposed to axially compress the cultivating disks on the elongated disk gang bolt when the plurality of threaded fasteners are tightened, thereby permitting the nut to be further tightened on the elongated disk gang bolt with reduced effort.

In another embodiment, a method of tensioning an agricultural disk gang is disclosed. The agricultural disk gang includes a plurality of cultivating disks supported on an elongated disk gang bolt. The elongated disk gang bolt has a threaded end with an externally threaded surface on which a nut is mounted. The nut is disposed to retain the cultivating disks on the elongated disk gang bolt. The method includes providing a tensioning structure having a plurality of threaded through holes and a plurality of threaded fasteners threadably engaged with the through holes. The method includes attaching the tensioning structure to the threaded end of the elongated disk gang bolt disposed on a side of the nut facing away from the cultivating disks. The method includes tightening the threaded fasteners to axially compress the cultivating disks on the elongated disk gang bolt. The method includes tightening the nut on the elongated disk gang bolt while the tensioning structure is compressing the cultivating disks.

Other features and aspects will become apparent by consideration of the detailed description and accompanying drawings.

BRIEF DESCRIPTION OF THE DRAWINGS

FIG. 3 is a sectioned view of a portion of the agricultural implement shown in FIG. 1 showing the disk gang bolt aperture.

FIG. 4 is a perspective view of a portion of the agricultural implement shown in FIG. 1 showing the locking structure.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
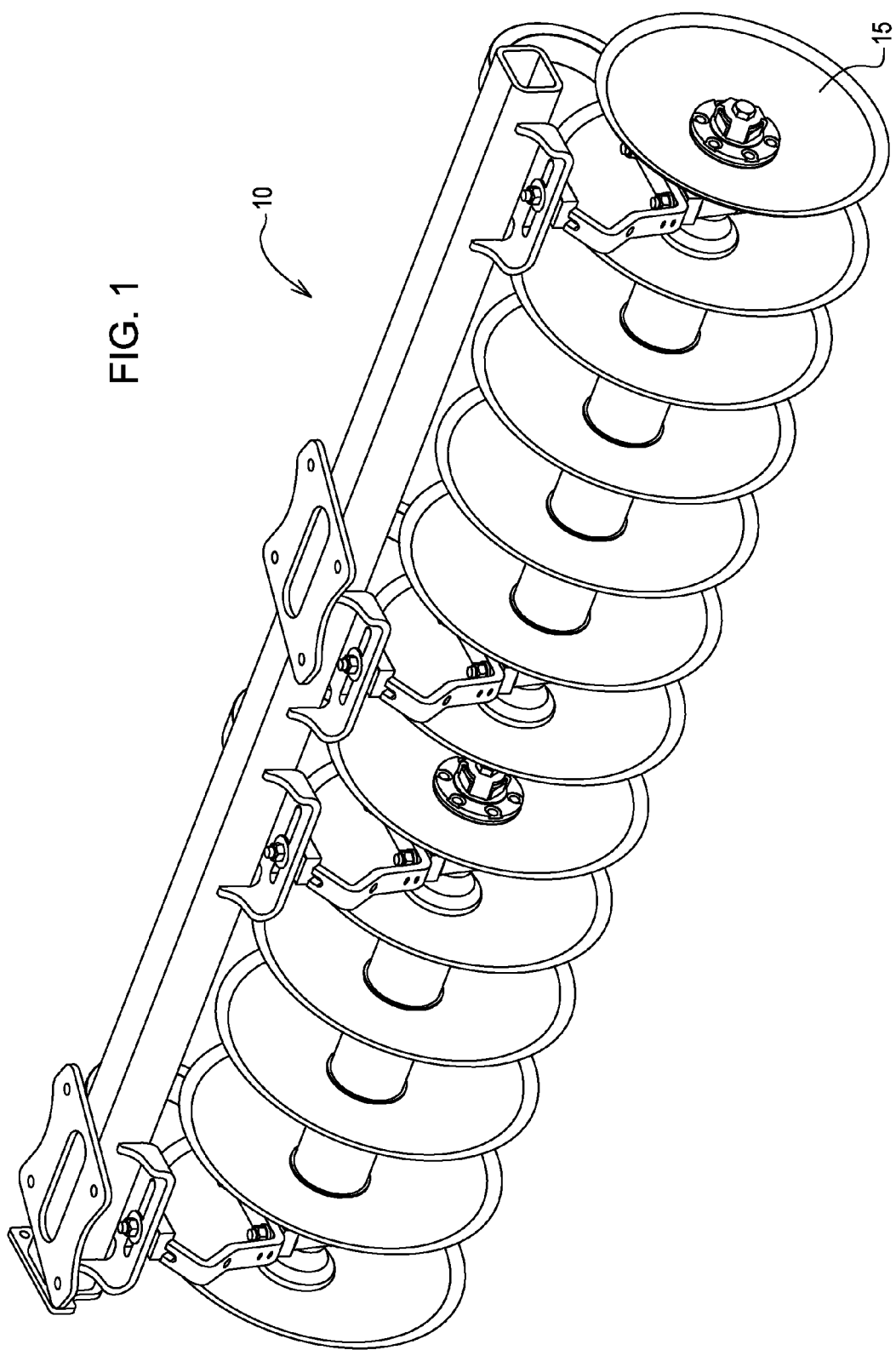
FIG. 1 is a perspective view of an agricultural implement according to one embodiment.

FIGS. 1-4 illustrate an agricultural disk gang 10. Referring to FIG. 1, the illustrated agricultural disk gang 10 includes a plurality of cultivating disks 15. Each of the cultivating disks 15 has a central aperture (not shown).

Figure 2:
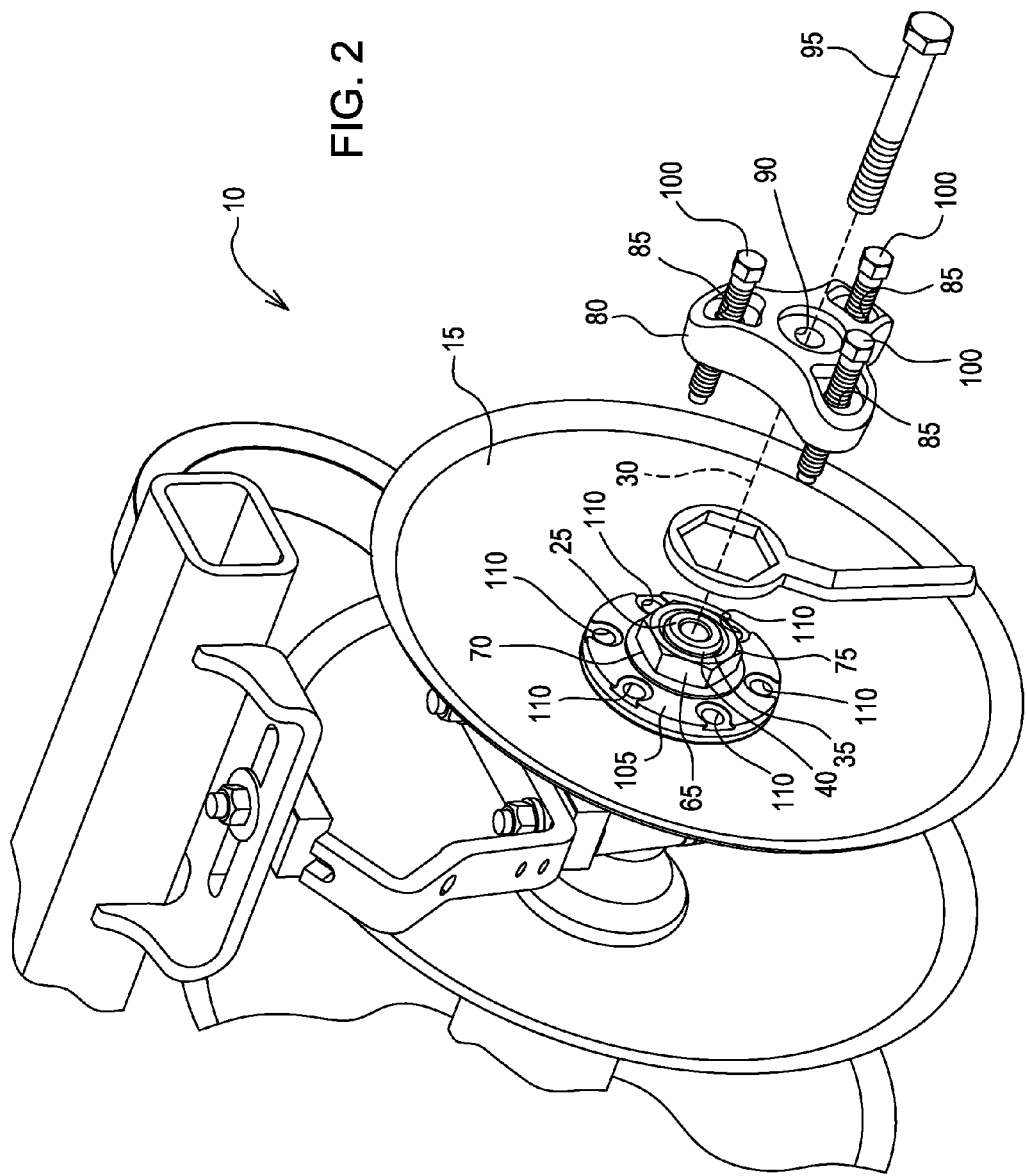
FIG. 2 is an exploded perspective view of a portion of the agricultural implement shown in FIG. 1 showing the tensioning structure.

Referring to FIG. 2, the cultivating disks 15 are supported on an elongated disk gang bolt 25 such that the elongated disk gang bolt 25 passes through the central aperture. The elongated disk gang bolt 25 has a longitudinal axis 30 and a threaded end 35 with an externally threaded surface 40.

With reference to FIG. 3, the elongated disk gang bolt 25 may have a disk gang bolt aperture 45 with an internally threaded portion 50. The disk gang bolt aperture 45 may have a non-threaded portion 55. The non-threaded portion 55 extends coaxial with the longitudinal axis 30 away from the threaded end 35 beyond the externally threaded surface 40 and adjacent the internally threaded portion 50 such that a segment 60 of the elongated disk gang bolt 25 has no internal or external threads.

Referring to FIG. 2, a nut 65 is threadably engaged with the externally threaded surface 40. The nut 65 has a first side 70 facing the cultivating disks 15 and a second side 75 facing away from the cultivating disks 15. The nut 65 is disposed to axially compress the cultivating disks 15 together on the elongated disk gang bolt 25 when tightened.

A tensioning structure 80 is mounted on the elongated disk gang bolt 25 outside of the nut 65 such that the second side 75 of the nut 65 faces the tensioning structure 80. The tensioning structure 80 has a plurality of threaded through holes 85. The tensioning structure 80 may have a central tensioning structure through hole 90. A tensioning structure fastener 95 may pass through the central tensioning structure through hole 90 and threadably engage the internally threaded portion 50 of the elongated disk gang bolt 25 to mount the tensioning structure 80 to the elongated disk gang bolt 25. The non-threaded portion 55 of the disk gang bolt aperture 45 is operable to tension the tensioning structure fastener 95.

A plurality of threaded fasteners 100 are threadably engaged with the threaded through holes 85 and are disposed to axially compress the cultivating disks 15 on the elongated disk gang bolt 25 when the plurality of threaded fasteners 100 are tightened. The compression of the cultivating disks 15 relieves some pressure on the nut 65. The compression of the cultivating disks 15 by the threaded fasteners 100 permits the nut 65 to be further tightened on the elongated disk gang bolt 25.

A tension mounting 105 may be coupled to the threaded end 35 adjacent the cultivating disks 15 and adjacent the first side 70 of the nut 65. The tension mounting 105 has a plurality of tension mounting apertures 110 that receive the threaded fasteners 100. The threaded fasteners 100 are compressively loaded in parallel such that the total compression transferred to the cultivating disks 15 is the sum of the compression generated by each of the threaded fasteners 100.

With reference to FIG. 4, a locking structure 115 may be coupled to the nut 65. The locking structure 115 is configured to secure the nut 65 in position relative to the elongated disk gang bolt 25 following removal of the tensioning structure fastener 95 and the tensioning structure 80 (FIG. 2). The locking structure 115 has a locking structure through hole (not shown) that receives a locking structure fastener 125. Alternatively, the nut 65 may be a castle nut (not shown) and the locking structure 115 may be a cotter pin (not shown) that is used to secure the castle nut in position relative to the elongated disk gang bolt 25.

In order to tension the agricultural disk gang 10 of FIG. 2, the tensioning structure 80 is attached to the threaded end 35 of the elongated disk gang bolt 25. The tensioning structure 80 is disposed on the second side 75 of the nut 65, facing away from the cultivating disks 15. The threaded fasteners 100 are tightened to axially compress the cultivating disks 15 on the elongated disk gang bolt 25. The nut 65 on the elongated disk gang bolt 25 is tightened while the tensioning structure 80 is compressing the cultivating disks 15. The tensioning structure fastener 95 and the tensioning structure 80 are removed from the elongated disk gang bolt 25. Removal helps to prevent corrosion of the tensioning structure fastener 95 and the tensioning structure 80. A locking structure 115 having a locking structure through hole is provided. The locking structure 115 is coupled to the nut 65 and configured to secure the nut 65 in position relative to the elongated disk gang bolt 25. A locking structure fastener 125 is passed through the locking structure through hole and threaded into the internally threaded portion 50 of the disk gang bolt aperture 45. The locking structure fastener 125 is tightened.

Advantageously, in this embodiment, adequate tension can be achieved in the elongated disk gang bolt 25 by using the tensioning structure 80 to relieve some pressure on the nut 65 and permit further tightening of the nut 65.

Figure 5:
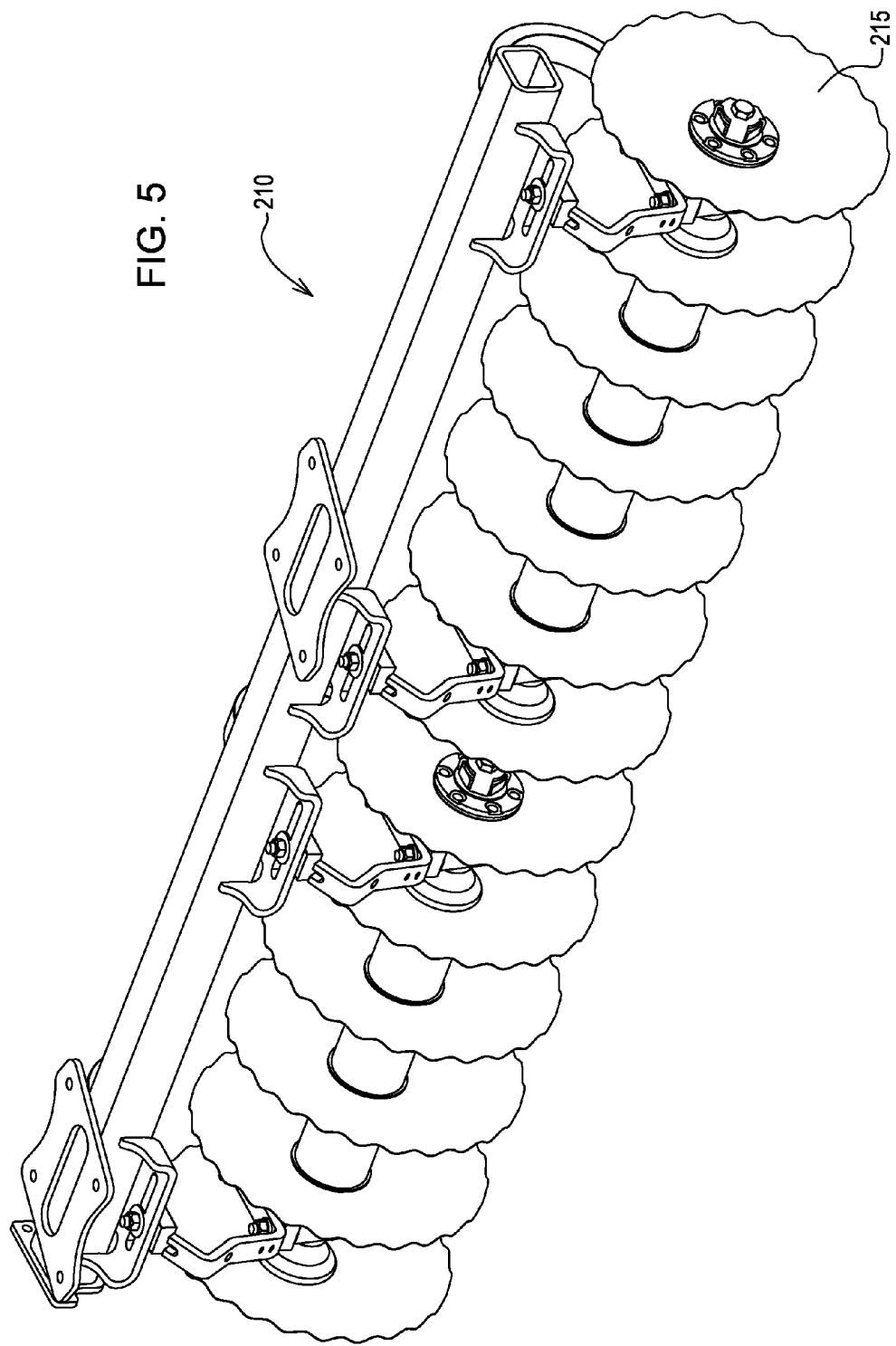
FIG. 5 is a perspective view of an agricultural implement according to another embodiment.

FIG. 5 illustrates an agricultural disk gang 210 according to another embodiment. In this embodiment, the agricultural disk gang 210 includes a plurality of coulter disks 215.

Figure 6:
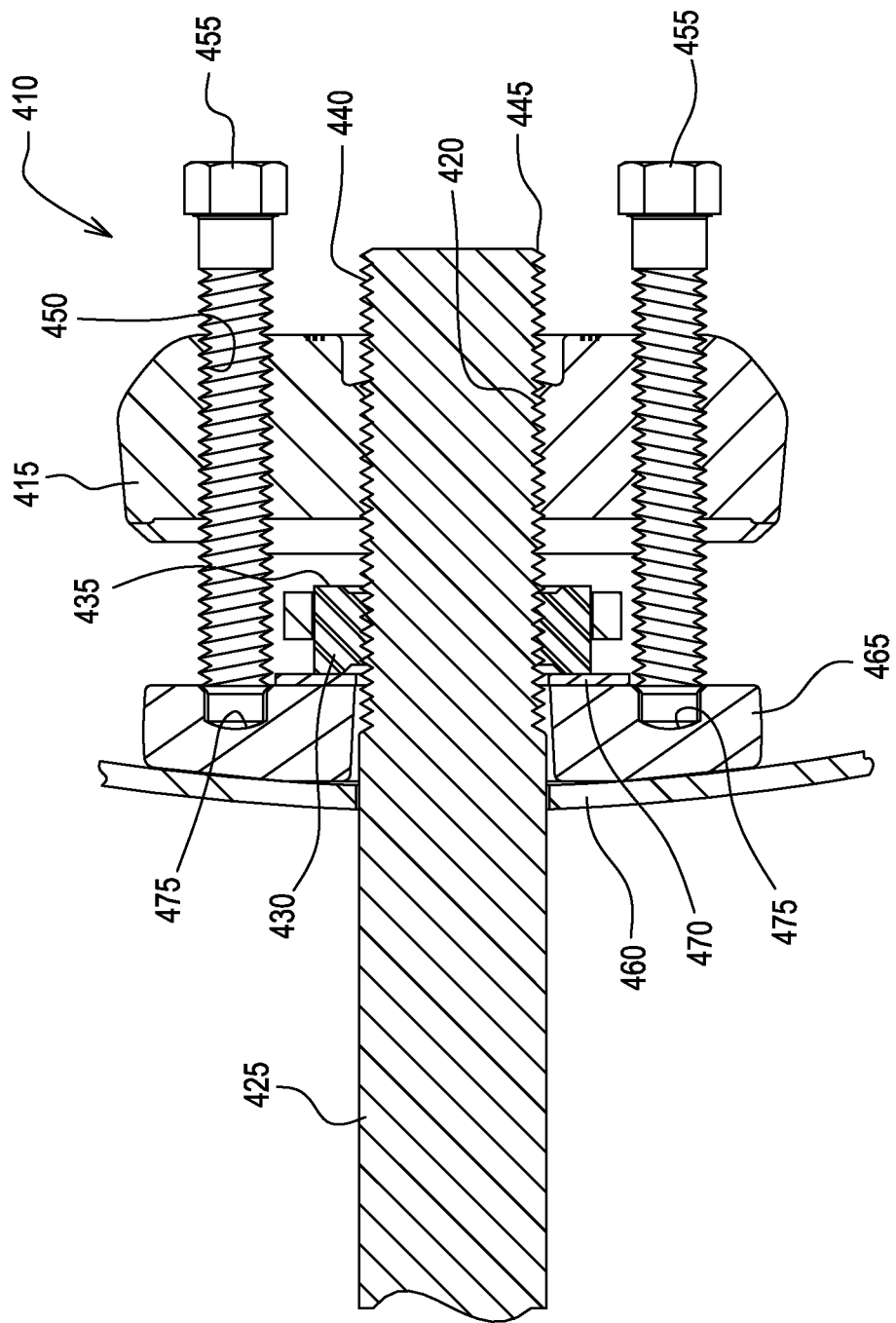
FIG. 6 is a sectioned view of an agricultural implement according to yet another embodiment.

FIG. 6 illustrates an agricultural disk gang 410 according to another embodiment. In this embodiment, the agricultural disk gang 410 includes a tensioning structure 415 having a central threaded through hole 420. The tensioning structure 415 is mounted on an elongated disk gang bolt 425 outside of a nut 430 such that a second side 435 of the nut 430 faces the tensioning structure 415. The central threaded through hole 420 is threadably engaged with an externally threaded surface 440 of a threaded end 445 of the elongated disk gang bolt 425.

The tensioning structure 415 has a plurality of threaded through holes 450. A plurality of threaded fasteners 455 are threadably engaged with the threaded through holes 450 and are disposed to axially compress a plurality of cultivating disks 460 on the elongated disk gang bolt 425 when the plurality of threaded fasteners 455 are tightened. The compression of the cultivating disks 460 relieves some pressure on the nut 430, thereby permitting the nut 430 to be further tightened on the elongated disk gang bolt 425.

A tension mounting 465 may be coupled to the threaded end 445 adjacent the cultivating disks 460 and adjacent a first side 470 of the nut 430. The tension mounting 465 has a plurality of tension mounting apertures 475 that receive the threaded fasteners 455. The threaded fasteners 455 are compressively loaded in parallel such that the total compression transferred to the cultivating disks 460 is the sum of the compression generated by each of the threaded fasteners 455.

Advantageously, in this embodiment, a tensioning structure fastener (not shown) is not required. Adequate tension can be achieved in the elongated disk gang bolt 425 by using the tensioning structure 415 to relieve some pressure on the nut 430 and permit further tightening of the nut 430.

Various features are set forth in the following claims.

What is claimed is:

1. An agricultural disk gang comprising:
    an elongated disk gang bolt comprising a longitudinal axis and a threaded end comprising an externally threaded surface;
    a plurality of cultivating disks supported on the elongated disk gang bolt, each of the cultivating disks defining a central aperture through which the elongated disk gang bolt extends;
    a nut threadably engaged with the externally threaded surface, the nut comprising a first side facing the cultivating disks and a second side facing away from the cultivating disks, the nut is disposed to axially compress the cultivating disks together on the elongated disk gang bolt when tightened;
    a tensioning structure mounted on the elongated disk gang bolt outside of the nut such that the second side of the nut faces the tensioning structure, the tensioning structure defining a plurality of threaded through holes; and
    a plurality of threaded fasteners threadably engaged with the threaded through holes and a plurality of apertures of a tension mounting, the threaded fasteners disposed to axially compress the cultivating disks on the elongated disk gang bolt when the plurality of threaded fasteners are tightened, thereby permitting the nut to be further tightened on the elongated disk gang bolt with reduced effort.

2. The agricultural disk gang of claim 1, wherein the plurality of cultivating disks is a plurality of coulter disks.

3. The agricultural disk gang of claim 1, wherein the tensioning structure defines a central tensioning structure through hole, the elongated disk gang bolt comprises a disk gang bolt aperture comprising an internally threaded portion, the internally threaded portion threadably engages a tensioning structure fastener that passes through the central tensioning structure through hole, the central tensioning structure fastener mounting the tensioning structure to the elongated disk gang bolt.

4. The agricultural disk gang of claim 3, wherein the disk gang bolt aperture comprises a non-threaded portion operable to tension the tensioning structure fastener.

5. The agricultural disk gang of claim 4, wherein the non-threaded portion extends coaxial with the longitudinal axis away from the threaded end beyond the externally threaded surface and adjacent the internally threaded portion such that a segment of the elongated disk gang bolt has no internal or external threads.

6. The agricultural disk gang of claim 4, wherein the tension mounting is coupled to the threaded end adjacent the cultivating disks and adjacent the first side of the nut, and wherein the threaded fasteners are compressively loaded in parallel such that the total compression transferred to the cultivating disks is the sum of the compression generated by each of the threaded fasteners.

7. The agricultural disk gang of claim 6, further comprising a locking structure coupled to the nut, the locking structure configured to secure the nut in position relative to the elongated disk gang bolt following removal of the tensioning structure fastener and the tensioning structure.

8. The agricultural disk gang of claim 7, wherein the locking structure defines a locking structure through hole that receives a locking structure fastener.

9. A method of tensioning an agricultural disk gang, the agricultural disk gang comprising a plurality of cultivating disks supported on an elongated disk gang bolt, the elongated disk gang bolt comprising a threaded end comprising an externally threaded surface on which a nut is mounted, the nut being disposed to retain the plurality of cultivating disks on the elongated disk gang bolt, the method comprising:
provided a tensioning structure defining a plurality of threaded through holes, a tension mounting defining a plurality of apertures, and a plurality of threaded fasteners threadably engaged with the through holes and the apertures;
attaching the tensioning structure to the threaded end of the elongated disk gang bolt, the tensioning structure disposed on a side of the nut facing away from the cultivating disks;
tightening the threaded fasteners to axially compress the cultivating disks on the elongated disk gang bolt; and
tightening the nut on the elongated disk gang bolt while the tensioning structure is compressing the cultivating disks.

10. The method of claim 9, wherein the plurality of cultivating disks is a plurality of coulter disks.

11. The method of claim 9, wherein the tensioning structure defines a central tensioning structure through hole, the elongated disk gang bolt comprises a disk gang bolt aperture comprising an internally threaded portion, a tensioning structure fastener passing through the central tensioning structure through hole and threadably engaging the internally threaded portion, the central tensioning structure fastener attaching the tensioning structure to the elongated disk gang bolt.

12. The method of claim 11, wherein the disk gang bolt aperture comprises a non-threaded portion operable to tension the tensioning structure fastener.

13. The method of claim 12, wherein the non-threaded portion extends axially away from the threaded end beyond the externally threaded surface and adjacent the internally threaded portion such that a segment of the elongated disk gang bolt has no internal or external threads.

14. The method of claim 13, wherein the tension mounting is coupled to the threaded end adjacent the plurality of cultivating disks and adjacent the nut, and wherein the threaded fasteners are compressively loaded in parallel such that the total tension transferred to the cultivating disks is the sum of the compression generated by each of the threaded fasteners.

15. The method of claim 14, further comprising removing the tensioning structure fastener and the tensioning structure from the elongated disk gang bolt.

16. The method of claim 15, further comprising providing a locking structure defining a locking structure through hole.

17. The method of claim 16, further comprising coupling the locking structure to the nut, the locking structure configured to secure the nut in position relative to the elongated disk gang bolt.

18. The method of claim 17, further comprising passing a locking structure fastener through the locking structure through hole and threading the locking structure fastener into the internally threaded portion of the disk gang bolt aperture.

19. The method of claim 18, further comprising tightening the locking structure fastener.

\* \* \* \* \*